United States Patent
Franklin et al.

(10) Patent No.: US 9,618,689 B2
(45) Date of Patent: Apr. 11, 2017

(54) ELECTRONIC DEVICES WITH DISPLAYS HAVING ATTACHED OPTICAL FILMS

(71) Applicant: Apple Inc., Cupertino, CA (US)

(72) Inventors: Jeremy C. Franklin, San Francisco, CA (US); Kevin D. Gibbs, San Carlos, CA (US); Amy Qian, San Jose, CA (US); John Raff, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 795 days.

(21) Appl. No.: 13/770,817

(22) Filed: Feb. 19, 2013

(65) Prior Publication Data

US 2014/0092342 A1    Apr. 3, 2014

Related U.S. Application Data

(60) Provisional application No. 61/707,777, filed on Sep. 28, 2012.

(51) Int. Cl.
G02F 1/1335    (2006.01)
F21V 8/00    (2006.01)

(52) U.S. Cl.
CPC ..... *G02B 6/0088* (2013.01); *G02F 1/133602* (2013.01)

(58) Field of Classification Search
CPC ................ G02F 1/133602; G02B 6/0088
USPC .......................................................... 349/65
See application file for complete search history.

(56) References Cited

U.S. PATENT DOCUMENTS

| | | | |
|---|---|---|---|
| 7,161,643 B2 | 1/2007 | Hayano | |
| 7,724,316 B2 | 5/2010 | Maruyama et al. | |
| 7,830,474 B2 | 11/2010 | Yamamoto et al. | |
| 2003/0223020 A1* | 12/2003 | Lee | G02B 6/0088 349/58 |
| 2007/0127144 A1 | 6/2007 | Gao | |
| 2007/0189024 A1 | 8/2007 | Nanbu et al. | |
| 2009/0027583 A1 | 1/2009 | McBroom et al. | |
| 2009/0103328 A1* | 4/2009 | Iwasaki | G02B 6/0041 362/617 |
| 2009/0122225 A1 | 5/2009 | Park | |
| 2011/0221980 A1 | 9/2011 | Kawabata et al. | |

FOREIGN PATENT DOCUMENTS

JP        10105074 A    *    4/1998

* cited by examiner

*Primary Examiner* — Paul Lee

(74) *Attorney, Agent, or Firm* — Treyz Law Group, P.C.; Zachary D. Hadd; Kendall W. Abbasi

(57) ABSTRACT

Electronic devices may include displays having backlight structures that include optical films. The optical films may help guide light from the backlight structures to display layers that generate display images using the light. The optical films may be attached together at one or more locations. The optical films may be attached to a structural member of the backlight structures. The structural member may be formed along each edge of the optical films and prevent the optical films from sliding within the display. Each optical film may be designed to expand to a common lateral size when the display is operated at a display operating temperature. The optical films may each include an elongated opening such as a slot through which a pin can be placed to partially constrain the movement of the optical films while allowing the optical films to expand or contract under changing thermal conditions in the display.

24 Claims, 15 Drawing Sheets

ELECTRONIC DEVICES WITH DISPLAYS HAVING ATTACHED OPTICAL FILMS

This application claims priority to U.S. provisional patent application No. 61/707,777 filed Sep. 28, 2012, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user. An electronic device may have a housing such as a housing formed from plastic or metal. Components for the electronic device such as display components may be mounted in the housing.

Displays often include one or more optical films that help distribute light from a light source for the display. These films often have a coefficient of thermal expansion that is high enough that the films expand when the temperature of the display rises during operation of the display. It can be therefore be challenging to secure optical films in a display while allowing the films to expand when exposed to rising temperatures. However, optical films that are unsecured may be prone to damage during a drop event or during assembly of the display.

It would therefore be desirable to be able to provide improved displays with optical films for electronic devices.

SUMMARY

An electronic device may be provided with a display. The display may have display layers for displaying images. Backlight structures may be included in the display. The backlight structures may provide backlight that illuminates the display layers in the display that are displaying an image for a user.

The backlight structures may include optical films such as light diffusing films, light-redirecting films, light-collimating films or other films for distributing light from the backlight to other portions of the display.

The optical films may be formed from materials having different coefficients of thermal expansion. A given optical film may therefore expand more or less or in different dimensions than another optical film when display temperatures rise when a display is powered on. The optical films may therefore be designed to expand to a common lateral size at a given temperature such as a nominal operating temperature of the display.

The edges of the optical films may be surrounded by a support structure that constrains the movement of the optical films. The optical films may be attached together at one or more locations such as along an edge of the optical films. Other portions of the optical films may be free to move with respect to each other so that the optical films can expand or contract when the operating temperature of the display rises or falls.

The portions of the optical films that are attached together may be attached together using adhesive or a pin, may be melted together using a hot bar, may be heat staked, may be spiral bound, may be thread bound, or may be attached together using other binding members or binding methods. An additional portion of the optical films may be constrained by providing a pin through a slot such as an elongated opening in each optical film that is aligned with a slot in each other film. The slot in each film may have an elongated dimension along a dimension in which that film exhibits maximum expansion under heat exposure. In this way, movement of the films may be partially constrained while allowing the films to expand and contract when exposed to changing temperatures.

The backlight structures may include support structures such as a metal support structure and a plastic support structure. The optical films may be placed in the display adjacent to the plastic support structure or a portion of the plastic support structure may be attached or insert molded onto the portion of the optical films that is attached together.

Further features of the invention, its nature and various advantages will be more apparent from the accompanying drawings and the following detailed description of the preferred embodiments.

DETAILED DESCRIPTION

Electronic devices may include displays. The displays may be used to display images to a user. Illustrative electronic devices that may be provided with displays are shown in FIGS. 1, 2, and 3.

Figure 1:
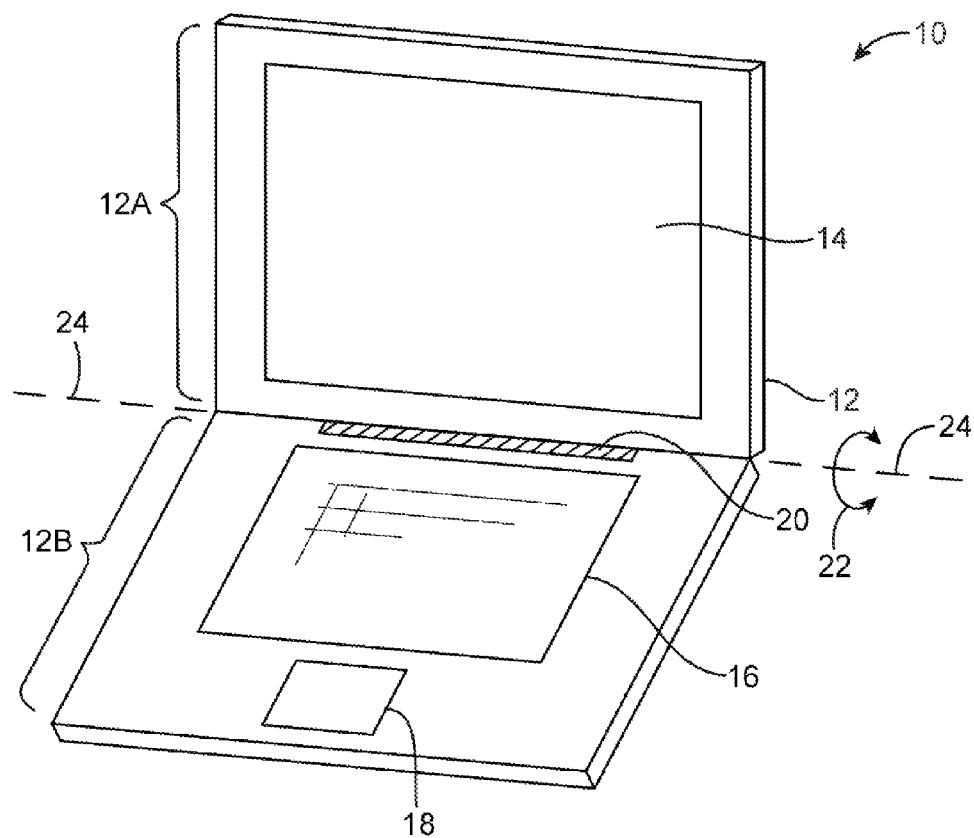
FIG. 1 is a perspective view of an illustrative electronic device such as a laptop computer with a display in accordance with an embodiment of the present invention.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
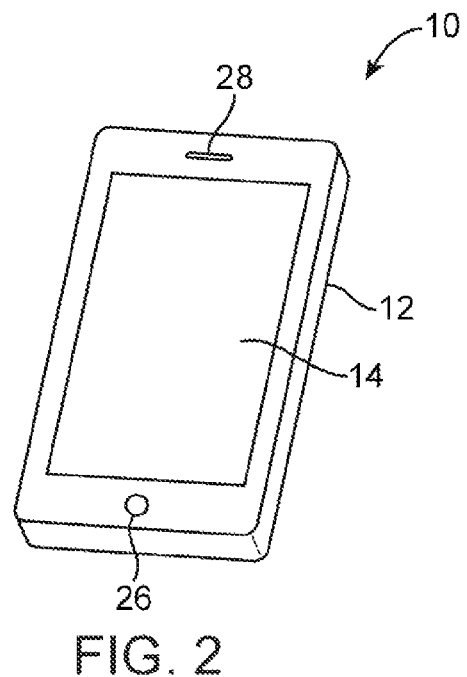
FIG. 2 is a perspective view of an illustrative electronic device such as a handheld electronic device with a display in accordance with an embodiment of the present invention.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have a display cover layer or other exterior layer that includes openings for components such as button 26. Openings may also be formed in a display cover layer or other display layer to accommodate a speaker port (see, e.g., speaker port 28 of FIG. 2).

Figure 3:
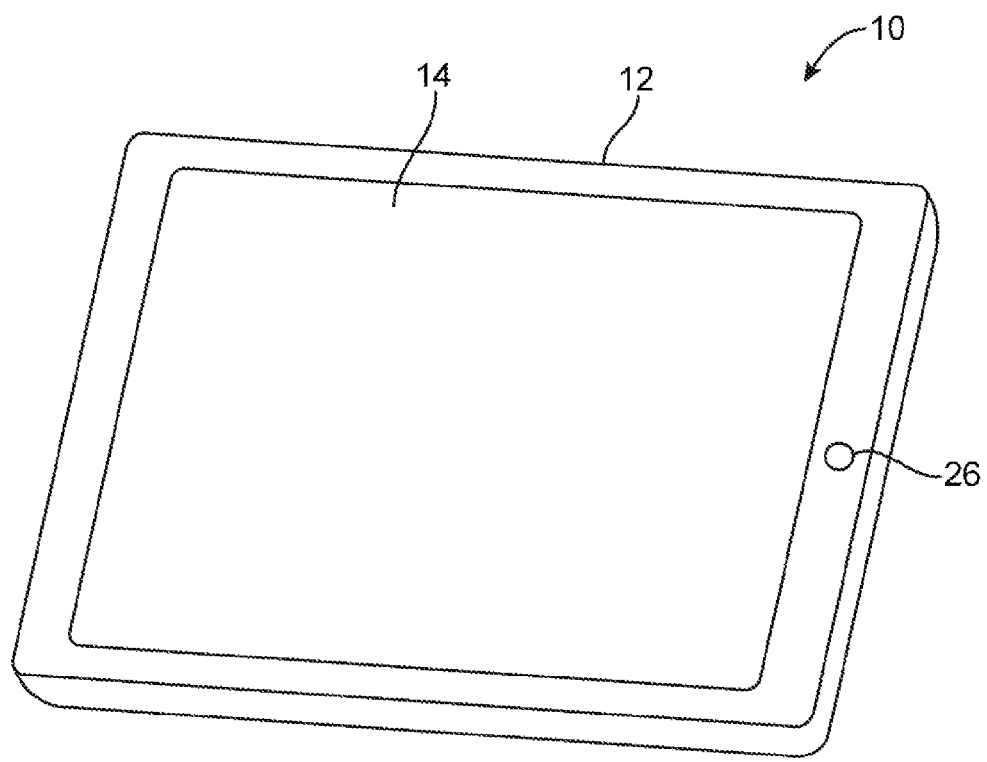
FIG. 3 is a perspective view of an illustrative electronic device such as a tablet computer with a display in accordance with an embodiment of the present invention.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have a cover layer or other external layer with an opening to accommodate button 26 (as an example).

The illustrative configurations for device 10 that are shown in FIGS. 1, 2, and 3 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined or cast aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Displays for device 10 may, in general, include image pixels formed from light-emitting diodes (LEDs), organic LEDs (OLEDs), plasma cells, electrowetting pixels, electrophoretic pixels, liquid crystal display (LCD) components, or other suitable image pixel structures. In some situations, it may be desirable to use LCD components to form display 14, so configurations for display 14 in which display 14 is a liquid crystal display are sometimes described herein as an example. It may also be desirable to provide displays such as display 14 with backlight structures, so configurations for display 14 that include a backlight unit may sometimes be described herein as an example. Other types of display technology may be used in device 10 if desired. The use of liquid crystal display structures and backlight structures in device 10 is merely illustrative.

A display cover layer may cover the surface of display 14 or a display layer such as a color filter layer or other portion of a display may be used as the outermost (or nearly outermost) layer in display 14. A display cover layer or other outer display layer may be formed from a transparent glass sheet, a clear plastic layer, or other transparent member.

Touch sensor components such as an array of capacitive touch sensor electrodes formed from transparent materials such as indium tin oxide may be formed on the underside of a display cover layer, may be formed on a separate display layer such as a glass or polymer touch sensor substrate, or may be integrated into other display layers (e.g., substrate layers such as a thin-film transistor layer).

Figure 4:
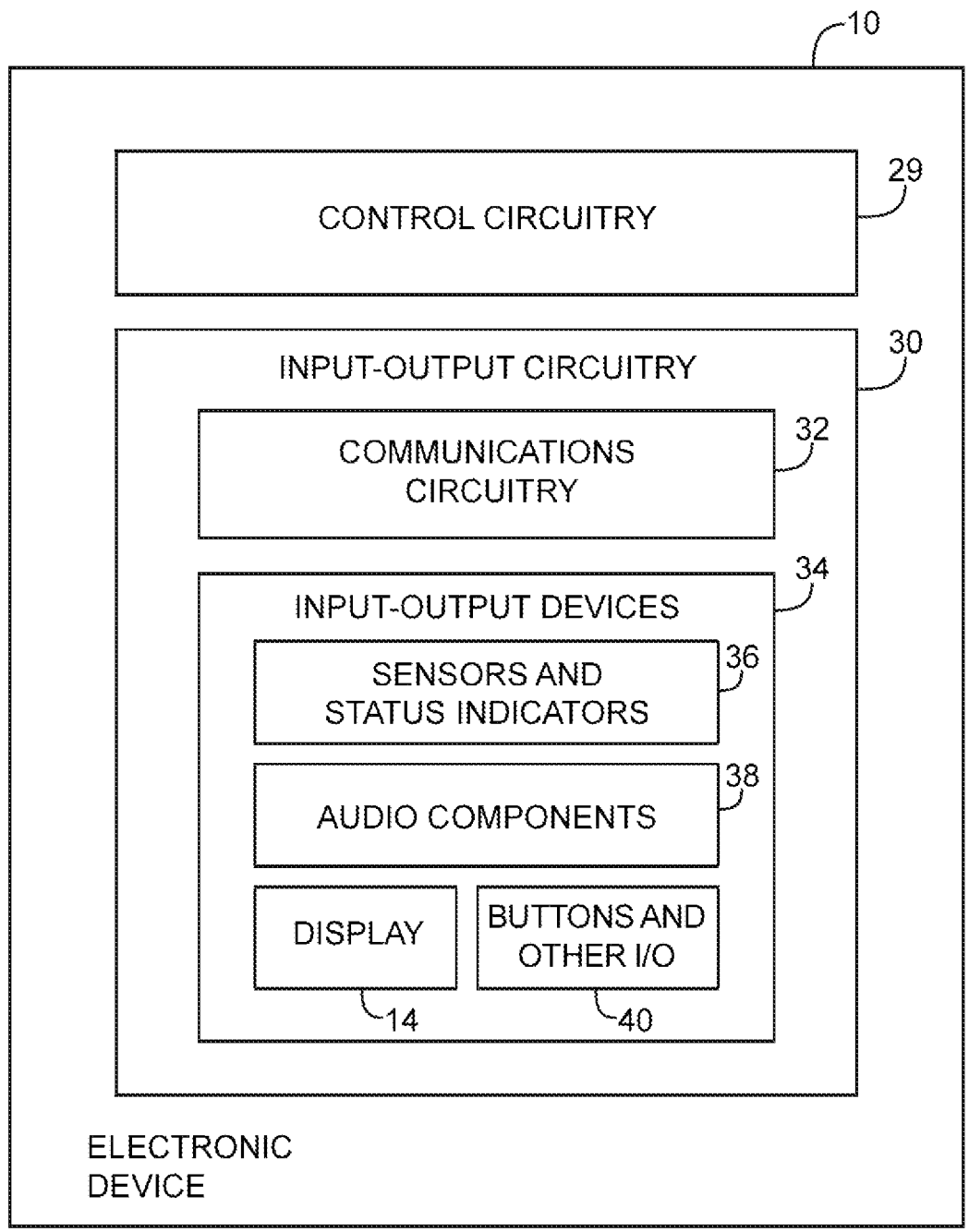
FIG. 4 is a schematic diagram of an illustrative electronic device with a display in accordance with an embodiment of the present invention.

A schematic diagram of an illustrative configuration that may be used for electronic device 10 is shown in FIG. 4. As shown in FIG. 4, electronic device 10 may include control circuitry 29. Control circuitry 29 may include storage and processing circuitry for controlling the operation of device 10. Control circuitry 29 may, for example, include storage such as hard disk drive storage, nonvolatile memory (e.g., flash memory or other electrically-programmable-read-only memory configured to form a solid state drive), volatile memory (e.g., static or dynamic random-access-memory), etc. Control circuitry 29 may include processing circuitry based on one or more microprocessors, microcontrollers, digital signal processors, baseband processors, power management units, audio codec chips, application specific integrated circuits, etc.

Control circuitry 29 may be used to run software on device 10, such as operating system software and application software. Using this software, control circuitry 29 may present information to a user of electronic device 10 on display 14. When presenting information to a user on display 14, sensor signals and other information may be used by control circuitry 29 in making adjustments to the strength of backlight illumination that is used for display 14.

Input-output circuitry 30 may be used to allow data to be supplied to device 10 and to allow data to be provided from device 10 to external devices. Input-output circuitry 30 may include communications circuitry 32. Communications circuitry 32 may include wired communications circuitry for supporting communications using data ports in device 10. Communications circuitry 32 may also include wireless communications circuits (e.g., circuitry for transmitting and receiving wireless radio-frequency signals using antennas).

Input-output circuitry 30 may also include input-output devices 34. A user can control the operation of device 10 by supplying commands through input-output devices 34 and may receive status information and other output from device 10 using the output resources of input-output devices 34.

Input-output devices 34 may include sensors and status indicators 36 such as an ambient light sensor, a proximity sensor, a temperature sensor, a pressure sensor, a magnetic sensor, an accelerometer, and light-emitting diodes and other components for gathering information about the environment in which device 10 is operating and providing information to a user of device 10 about the status of device 10.

Audio components 38 may include speakers and tone generators for presenting sound to a user of device 10 and microphones for gathering user audio input.

Display 14 may be used to present images for a user such as text, video, and still images. Sensors 36 may include a touch sensor array that is formed as one of the layers in display 14.

User input may be gathered using buttons and other input-output components 40 such as touch pad sensors, buttons, joysticks, click wheels, scrolling wheels, touch sensors such as sensors 36 in display 14, key pads, keyboards, vibrators, cameras, and other input-output components.

Figure 5:
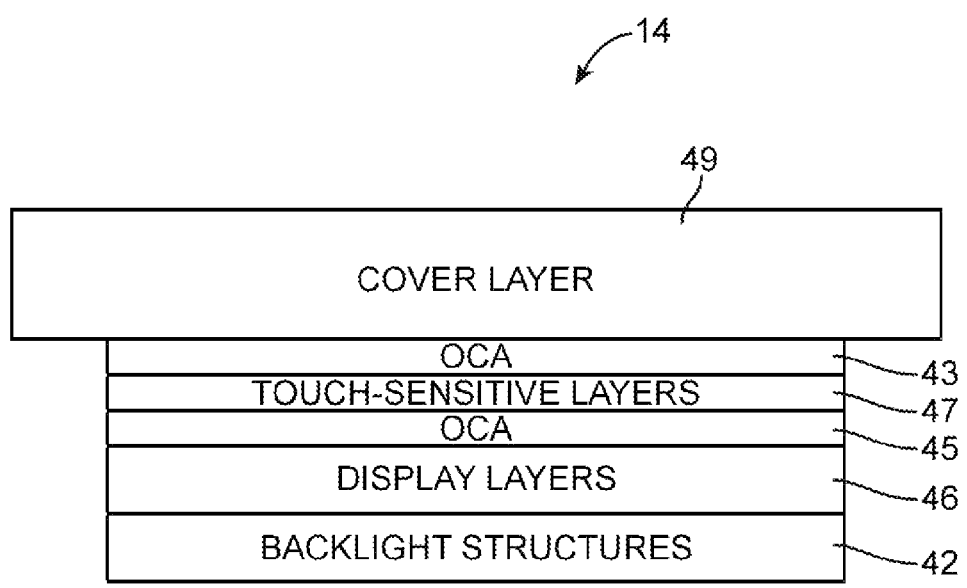
FIG. 5 is a cross-sectional side view of an illustrative display in accordance with an embodiment of the present invention.

A cross-sectional side view of an illustrative configuration that may be used for display 14 of device 10 (e.g., for display 14 of the devices of FIG. 1, FIG. 2, or FIG. 3 or other suitable electronic devices) is shown in FIG. 5. As shown in FIG. 5, display 14 may include one or more layers of touch sensitive components such as touch-sensitive layers 47 that are attached to a cover layer such as cover layer 49. Cover layer 49 may be formed from a sheet of rigid or flexible transparent material such as glass or plastic.

Touch-sensitive layers 47 may be attached to cover layer 49 using an adhesive material such as optically clear adhesive (OCA) 43. Adhesive 43 may be a liquid adhesive, light-cured adhesive, pressure-sensitive adhesive or other suitable adhesive. Touch-sensitive layers 47 may include touch sensor components such as an array of capacitive touch sensor electrodes formed from transparent materials such as indium tin oxide.

Display 14 may include display layers such as layers 46 for generating images to be displayed on display 14. Display layers 46 may include polarizer layers, color filter layers, transistor layers, adhesive layers, layers of liquid crystal material, or other layers for generating display images. Display layers 46 may be attached to touch-sensitive layers 43 using adhesive such as optically clear adhesive 45. Adhesive 45 may be a liquid adhesive, light-cured adhesive, pressure-sensitive adhesive or other suitable adhesive.

Display layers 46 may use light generated by light-generating structures such as backlight structures 42 to form images to be viewed by a user of device 10. Backlight structures 42 may include light-generating components such as light-emitting diodes, light guiding structures, reflective structures, optical films, etc. Backlight structures 42 may be attached to display layers 46 or may be mounted adjacent to layers 46 by attaching backlight structures 42 to one or more structural members.

Figure 6:
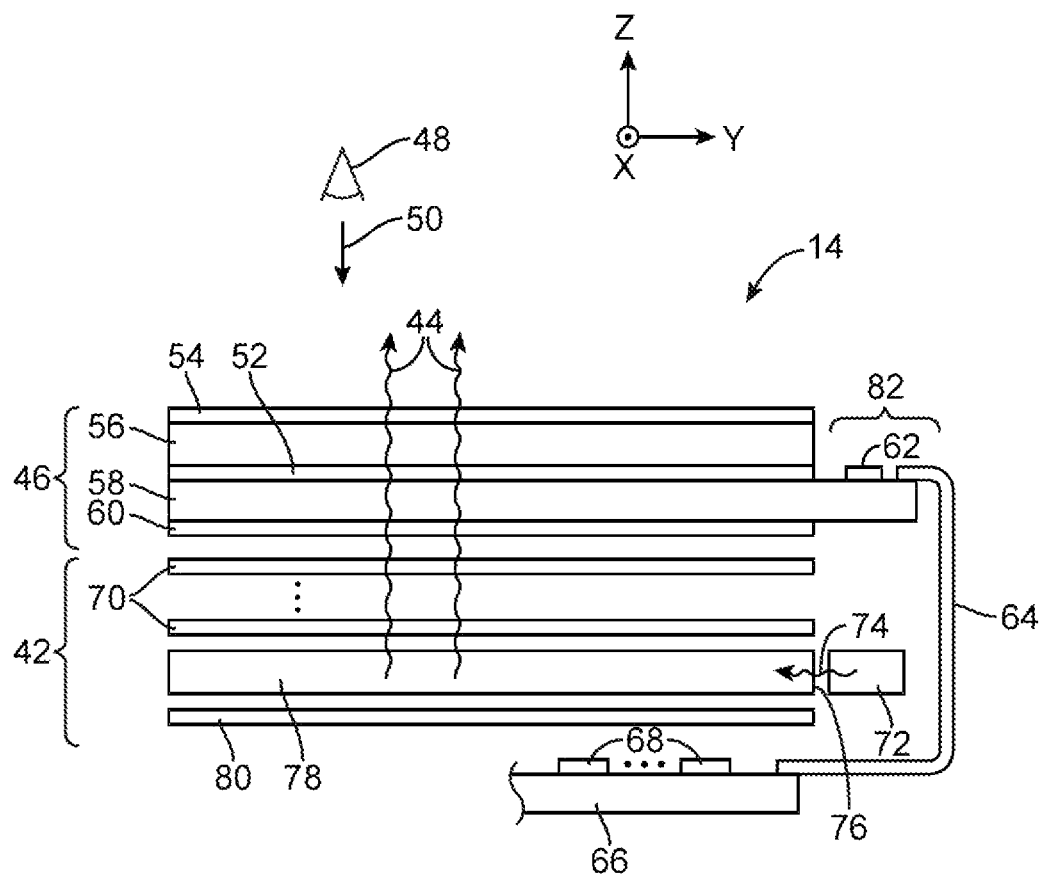
FIG. 6 is a cross-sectional side view of illustrative display layers and backlight structures in accordance with an embodiment of the present invention.

A cross-sectional side view of an illustrative configuration that may be used for display layers 46 and backlight structures 42 of display 14 (e.g., for display layers 46 and backlight structures 42 of the display of FIG. 5, or other suitable display) is shown in FIG. 6. As shown in FIG. 6, display 14 may include backlight structures such as backlight unit 42 for producing backlight 44. During operation, backlight 44 travels outwards (vertically upwards in dimension Z in the orientation of FIG. 6) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54. If desired, upper polarizer layer 54 may be attached to an outer cover layer such as cover layer 49 (FIG. 5).

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of thin-film transistors and associated electrodes (display pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer.

During operation of display 14 in device 10, control circuitry 29 (e.g., one or more integrated circuits such as components 68 on printed circuit 66 of FIG. 6) may be used to generate information to be displayed on display 14 (e.g., display data). The information to be displayed may be conveyed from circuitry 68 to display driver integrated circuit 62 using a signal path such as a signal path formed from conductive metal traces in flexible printed circuit 64 (as an example).

Display driver integrated circuit 62 may be mounted on thin-film-transistor layer driver ledge 82 or elsewhere in device 10. A flexible printed circuit cable such as flexible printed circuit 64 may be used in routing signals between printed circuit 66 and thin-film-transistor layer 58. If desired, display driver integrated circuit 62 may be mounted on printed circuit 66 or flexible printed circuit 64.

Printed circuit 66 may be formed from a rigid printed circuit board (e.g., a layer of fiberglass-filled epoxy) or a flexible printed circuit (e.g., a flexible sheet of polyimide or other flexible polymer layer). However, these examples are merely illustrative. If desired printed circuits 64 and 66 may be formed from a combination of rigid and flexible printed circuit layers (e.g., printed circuit 66 may be formed from a rigid printed circuit board with a layer of flexible printed circuitry that extends from an edge of printed circuit 66 to form flexible printed circuitry 64 that attaches to thin-film-transistor layer 58).

Backlight structures 42 may include a backlight light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed laterally in dimensions X and Y throughout light guide plate 78 due to the principal of total internal reflection. Light guide plate 78 may include light-scattering features such as pits or bumps or other light-scattering structures. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 6, optical films 70 and reflector 80 may have a substantially similar rectangular footprint.

Figure 7:
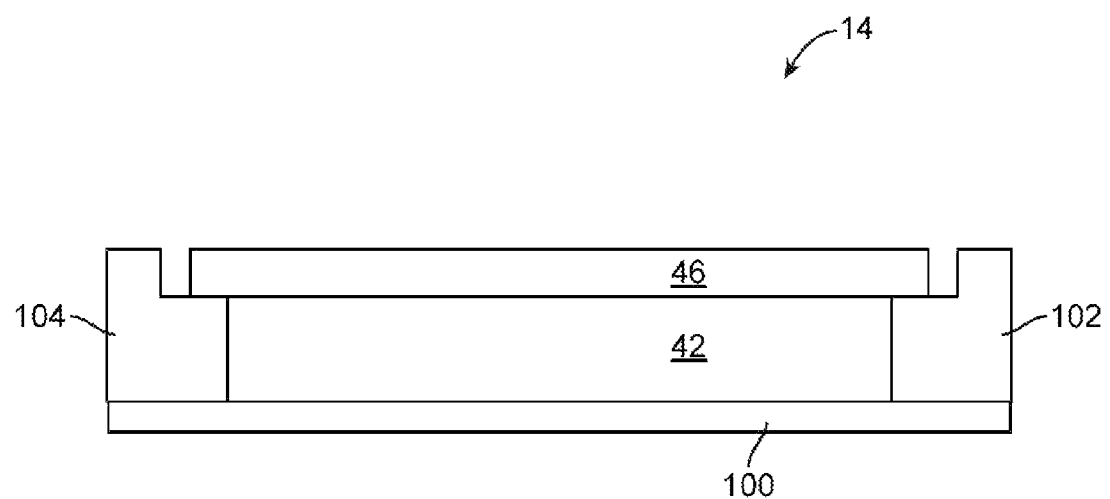
FIG. 7 is a cross-sectional side view of an illustrative display showing how backlight structures and display layers may be mounted to support structures in accordance with an embodiment of the present invention.

As shown in FIG. 7, display 14 may include structural members such as support structures 100, 102, and 104. Member 100 may, for example, be a metal support member such as a metal chassis. Members 102 and 104 may, for example, be plastic support members that are molded onto metal member 100 or otherwise attached to member 100. Members 102 and 104 may be separate members or may be portions of a common structure (e.g., a plastic chassis structure that surrounds the edges of display layers 46). Members 102 and 104 may each include a recess such as a ridge. Display layers 46 may be attached to the ridge on members 102 and 104.

Backlight structures 42 may be mounted between members 102 and 104. Backlight structures may be attached to member 100 or to members 102 and/or 104. Optical films 70 (see, e.g., FIG. 6) may be constrained within display 14 at least partially by structural members such as members 102 and 104. As examples, films 70 may be placed within a space between members 102 and 104, may be molded into one or more of members 104, may include one or more portions (e.g., tabs) that extend into cavities in members 102 and/or 104 or may be otherwise mounted in display 14.

Figure 8:
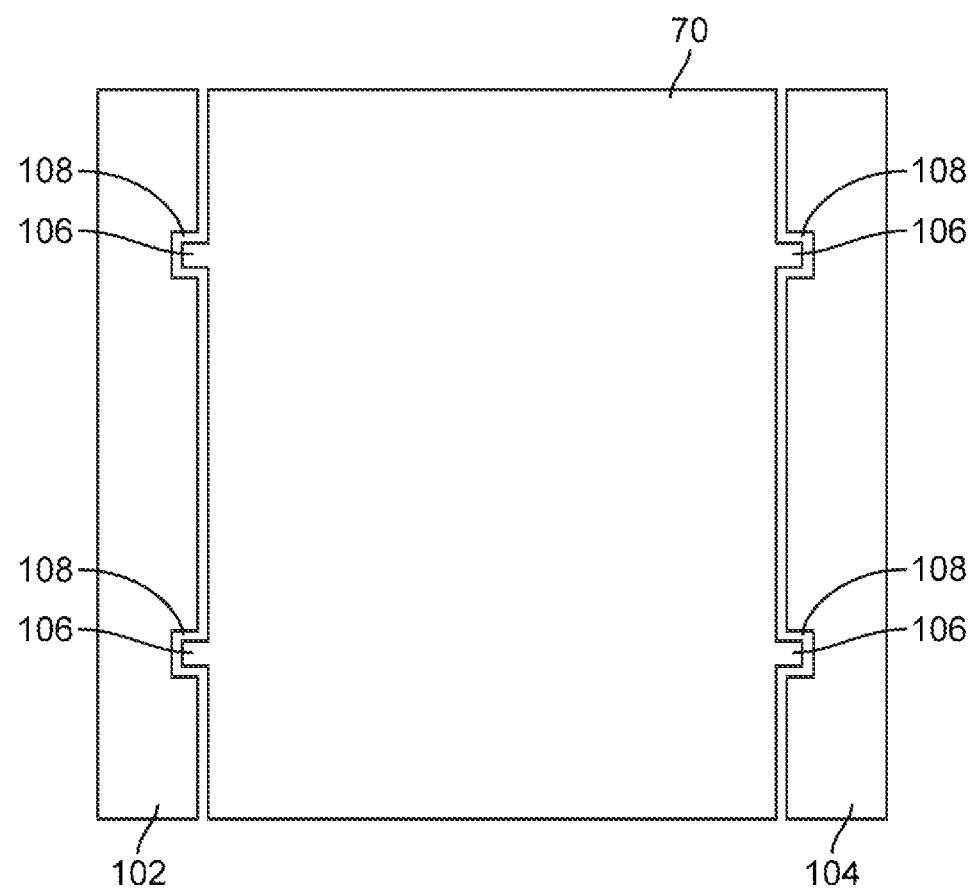
FIG. 8 is a cross-sectional top view of an illustrative display showing how a support structure for a display may include openings that receive extended tabs on optical films in accordance with an embodiment of the present invention.

In the example shown in FIG. 8, optical films 70 include protruding portions such as tabs 106 along edges of films 70 that extend into cavities 108 in structures 102 and 104. Optical films 70 may include tabs 106 along one edge, along two edges, along three edges, or along all edges of films 70. During a drop event in which device 10 receives an impact, tabs 106 may move into contact with sidewalls of cavities 108, thereby preventing films 70 from sliding out of position and negatively affecting the performance of display 14. The size of members 102 and/or 104 may be increased in order to accommodate cavities 108. This may create an undesirable increase in peripheral support portions of display 14. If desired, optical films 70 may therefore be provided without any tabs 106.

Figure 9:
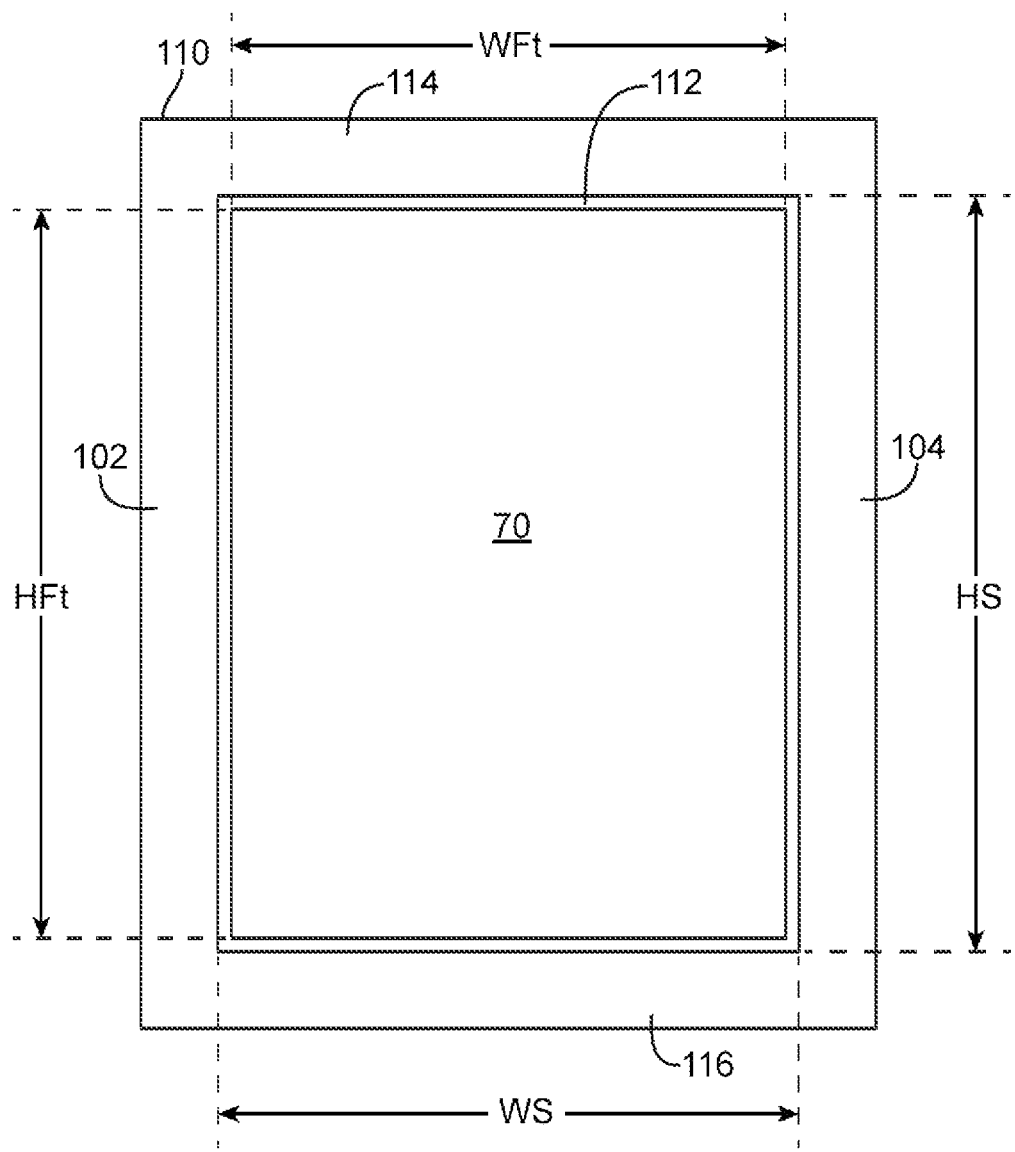
FIG. 9 is a cross-sectional top view of an illustrative display showing how optical films having a common lateral size at a given temperature may be mounted within a cavity between structural members for the display in accordance with an embodiment of the present invention.

In the example of FIG. 9, optical films 70 are provided without any tabs 106. As shown in FIG. 9, films 70 may be mounted in an opening such as opening 112 between a structural member such as support structure 110. In the example of FIG. 9, member 110 includes members 102 and 104 along two edges of films 170 and additional portions 114 and 116 along respective top and bottom edges of films 70. Structures 102, 104, 114, and 116 may be formed from plastic, glass, ceramic or other materials and may form a single continuous structure or structures 102, 104, 114, and 116 may be one or more separate structures.

Multiple optical films 70 may be placed separately into opening 112 or optical films 70 may be attached to each other prior to placement in opening 112. Optical films 70 may be attached to one or more of members 102, 104, 114, and/or 116 or may be able to move within opening 112. Each optical film 70 may have an associated coefficient of thermal expansion (CTE) that indicates the extent to which that optical film expands when the temperature of the film rises.

Opening 112 may have a lateral width WS and a lateral height HS. Optical films 70 may each be designed so that, at a given temperature, t (e.g., a common operating temperature of display 14), all optical films 70 have a common lateral width WFt and a common lateral height HFt. Each optical film 70 may have a lateral width and a lateral height that is different from WFt and HFt at other temperatures. Operating temperature t may be, as examples, between 70 C. and 80 C., between 60 C. and 90 C., between 70 C. and 100 C., between 75 C. and 85 C., less than 120 C., or greater than 10 C.

Common lateral width WFt and a common lateral height HFt of films 70 at temperature t may be respectively smaller than lateral width WS and a lateral height HS by a predetermined amount. In this way, films 70 may be constrained within opening 112 and protected from damage during a drop event while allowing films 70 to expand and contract within opening 112.

Figure 10A:
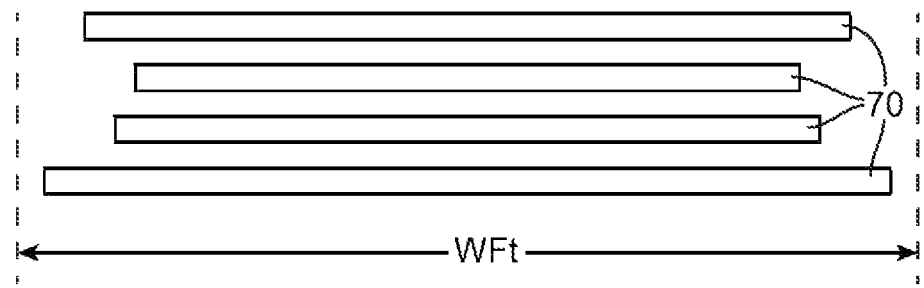
FIG. 10A is a cross-sectional side view of illustrative optical films for a display having various lateral sizes in accordance with an embodiment of the present invention.
Figure 10B:
FIG. 10B is a cross-sectional side view of illustrative optical films of the type shown in FIG. 10A showing how the optical films may expand to have a common lateral size at a particular temperature in accordance with an embodiment of the present invention.

FIG. 10A shows an exemplary set of optical films 70 at a temperature t' that is different from temperature t. At temperature t', each film 70 may have a lateral width that is different from lateral width WFt. When the temperature of films 70 is raised to temperature t, each optical film 70 may expand to have to a lateral width that is substantially equal to lateral width WFt as shown in FIG. 10B.

During assembly of backlight structures such as backlight structures 42, optical films such as films 70 may be prone to damage (e.g., scratching) if the films are free to move with respect to one another. In order to prevent excessive movement of films 70 with respect to each other, optical films 70 may be attached to each other. Each optical film 70 may have one or more portions that are attached to a corresponding portion of another film 70 and other portions that remain unattached so that films 70 are able to expand and contract under changes in display temperature.

Figure 11:
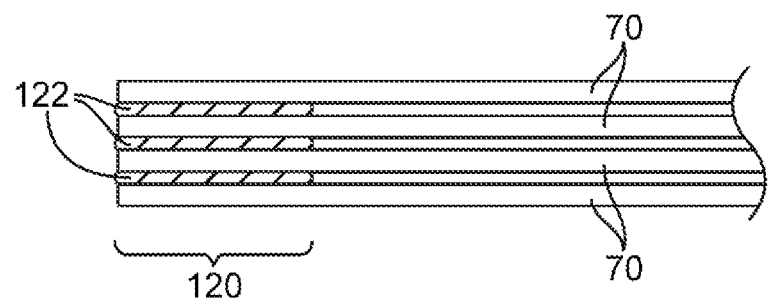
FIG. 11 is a cross-sectional side view of illustrative optical films that are attached together using adhesive in accordance with an embodiment of the present invention.

As shown in FIG. 11, a portion such as portion 120 of films 70 may be attached together using adhesive such as adhesive 122 that is interposed between each film in region 120. Portion 120 of films 70 may be a portion that is located along an edge of films 70 as shown in FIG. 11, or films 70 may be attached together at one or more other locations such regions 120' of FIG. 12.

Figure 12:
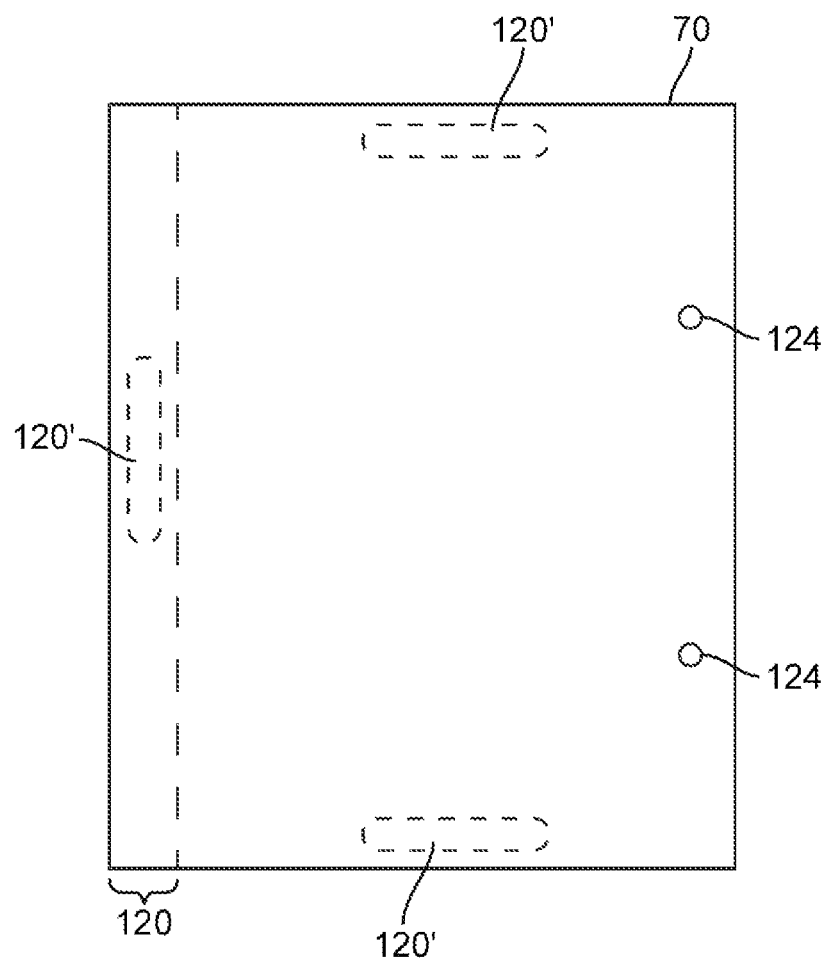
FIG. 12 is a top view of illustrative optical films that are attached together showing various possible locations at which the films can be attached together in accordance with an embodiment of the present invention.

As shown in FIG. 12, films 70 may be attached in a region 120 that extends along substantially all of one edge of films 70 or films 70 may be attached together in one or more other regions such regions 120'. Regions 120' may include a region along a portion of an edge such as a portion of a side edge, a portion of a top edge and/or a portion of a bottom edge.

If desired, films 120 may include openings such as one or more slots 124. Slots 124 may be used to receive a pin that passes through slots 124 in order to help constrain films 70 within backlight structures 42. Slots 124 may have a size and a shape that is larger than the pin that passes through the slot. In this way, pins in slots 124 may partially constrain the movement of films 70 while allowing for some expansion and contraction of films 70.

If desired, films 70 may be attached together in portion 120 and/or portions 120' using adhesive as described above in connection with FIG. 11. However, this is merely illustrative. If desired, films 70 may be attached together in portion 120 and/or portions 120' using other attachment structures or attachment methods as shown in FIGS. 13, 14, 15, 16, and 17.

Figure 13:
FIG. 13 is a cross-sectional side view of illustrative optical films that are attached together using a hot bar in accordance with an embodiment of the present invention.

In the example of FIG. 13, films 70 are attached together in region 120 (or one or more of regions 120') using hot bars 126 to melt films 70 together in that region by pressing hot bars 126 against films 70 as indicated by arrows 136.

Figure 14:
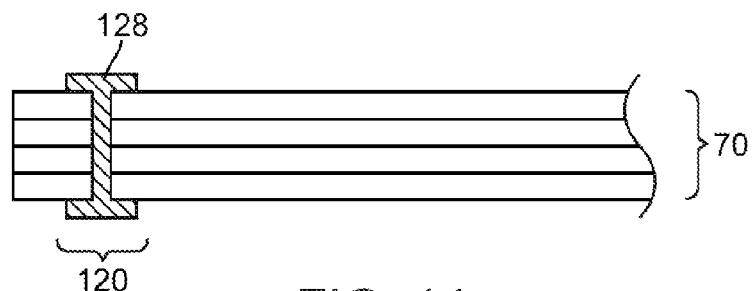
FIG. 14 is a cross-sectional side view of illustrative optical films that are attached together using pins in accordance with an embodiment of the present invention.

In the example of FIG. 14, films 70 are attached together in region 120 (or one or more of regions 120') using a fastening member such as pin 128 that passes through openings in films 70 in that region and fastens the films together.

Figure 15:
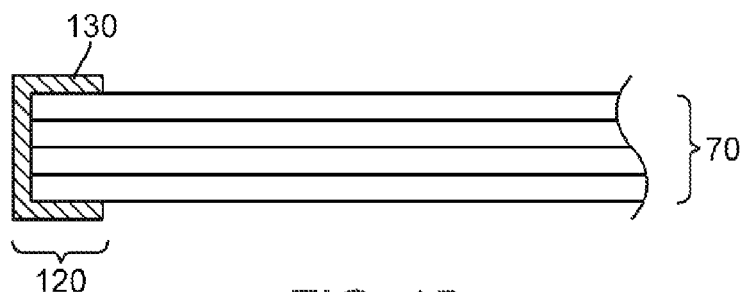
FIG. 15 is a cross-sectional side view of illustrative optical films that are attached together using a clamping structure such as a book-binding structure in accordance with an embodiment of the present invention.

In the example of FIG. 15, films 70 are attached together in region 120 (or one or more of regions 120') using a binding structure such as clamping structure 130 (e.g. a structure such as a book-binding structure that binds together pages of a book) that provides a squeezing force that attaches films 70 together in that region.

Figure 16:
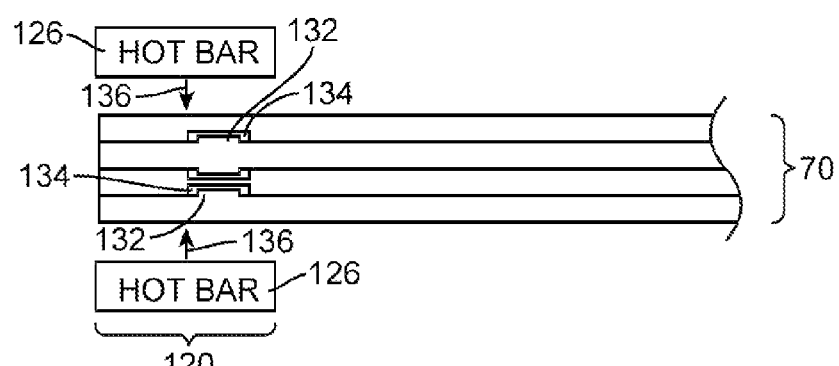
FIG. 16 is a cross-sectional side view of illustrative optical films that are heat staked together in accordance with an embodiment of the present invention.

In the example of FIG. 16, films 70 are attached together in region 120 (or one or more of regions 120') by heat staking the films together in that region. Heat staking films 70 together in region 120 may include providing some films with protruding portions 132 that fit into openings 134 in adjacent films and pressing films 70 in region 120 using hot bars 126 as indicated by arrows 136 so that protruding portions 132 expand to fill openings 134).

Figure 17:
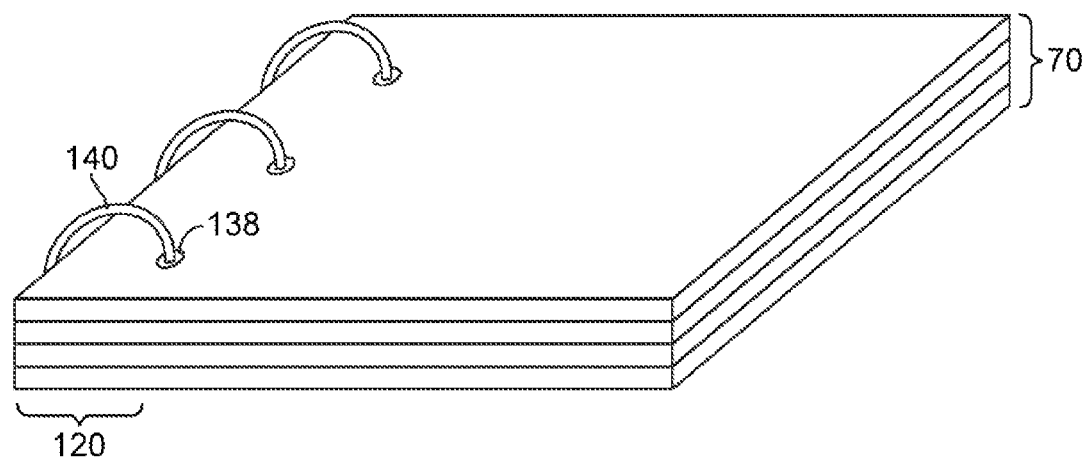
FIG. 17 is a cross-sectional side view of illustrative optical films that are attached together using binding structures that pass through openings in a portion of the films in accordance with an embodiment of the present invention.

In the example of FIG. 17, films 70 are attached together in region 120 (or one or more of regions 120') using binding members 140 that pass through openings 138 in films 70 and wrap around an outside edge of films 70 in that region. Binding members 140 may be formed from wire, thread or other materials. Binding members 140 may be a single continuous binding member that wraps around the edge of films 70 and through multiple openings 138 in a spiral pattern or films 70 may be provided with a binding member 140 associated with each opening 138.

Figure 18:
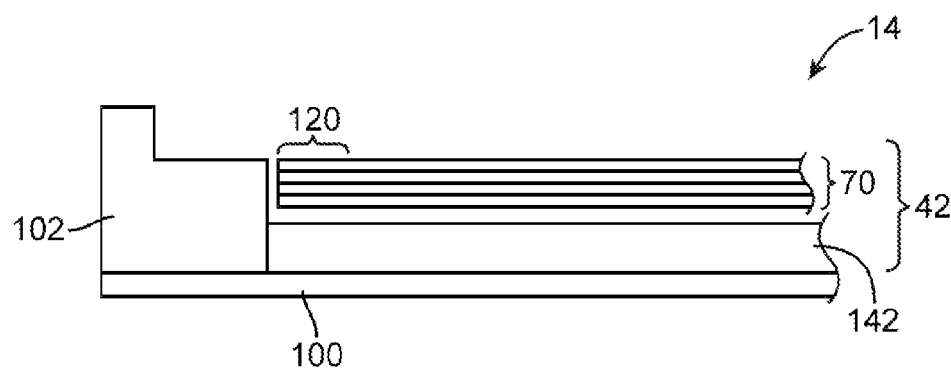
FIG. 18 is a cross-sectional side view of illustrative optical films that are attached together and placed in backlight structures adjacent to a structural member in accordance with an embodiment of the present invention.

As shown in FIG. 18, optical films 70 that are attached together in region 120 (or in one or more regions 120') may be mounted in display 14 so that region 120 is adjacent to plastic structural member 102. Other backlight structures 142 (e.g., light guide 78 and reflector 80) may be interposed between films 70 and metal structural member 100. In the example of FIG. 18, films 70 are attached together but are free of attachments to structural member 102. However, this is merely illustrative. If desired, portion 120 of films 70 may be attached to member 102.

Figure 19:
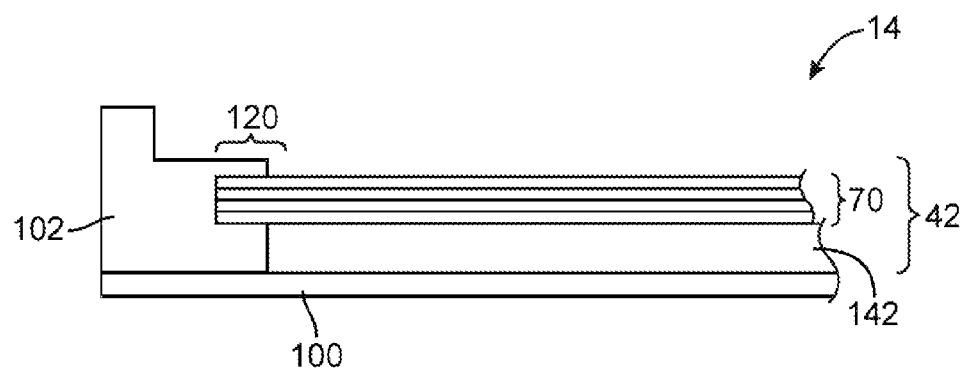
FIG. 19 is a cross-sectional side view of illustrative optical films that are attached together showing how a plastic structural member may be molded onto the attached portion of the films in accordance with an embodiment of the present invention.

As shown in FIG. 19, some or all of portion 120 of films 70 may be attached to member 102 by molding (e.g., insert molding) member 102 onto portion 120 of films 70. Other portions of films 70 (e.g., an opposing edge of films 70) may be free of attachments to structural members of display 14. In this way, films 70 may be secured within display 14 while allowing films 70 to expand and/or contract when the temperature of display 14 changes.

Figure 20:
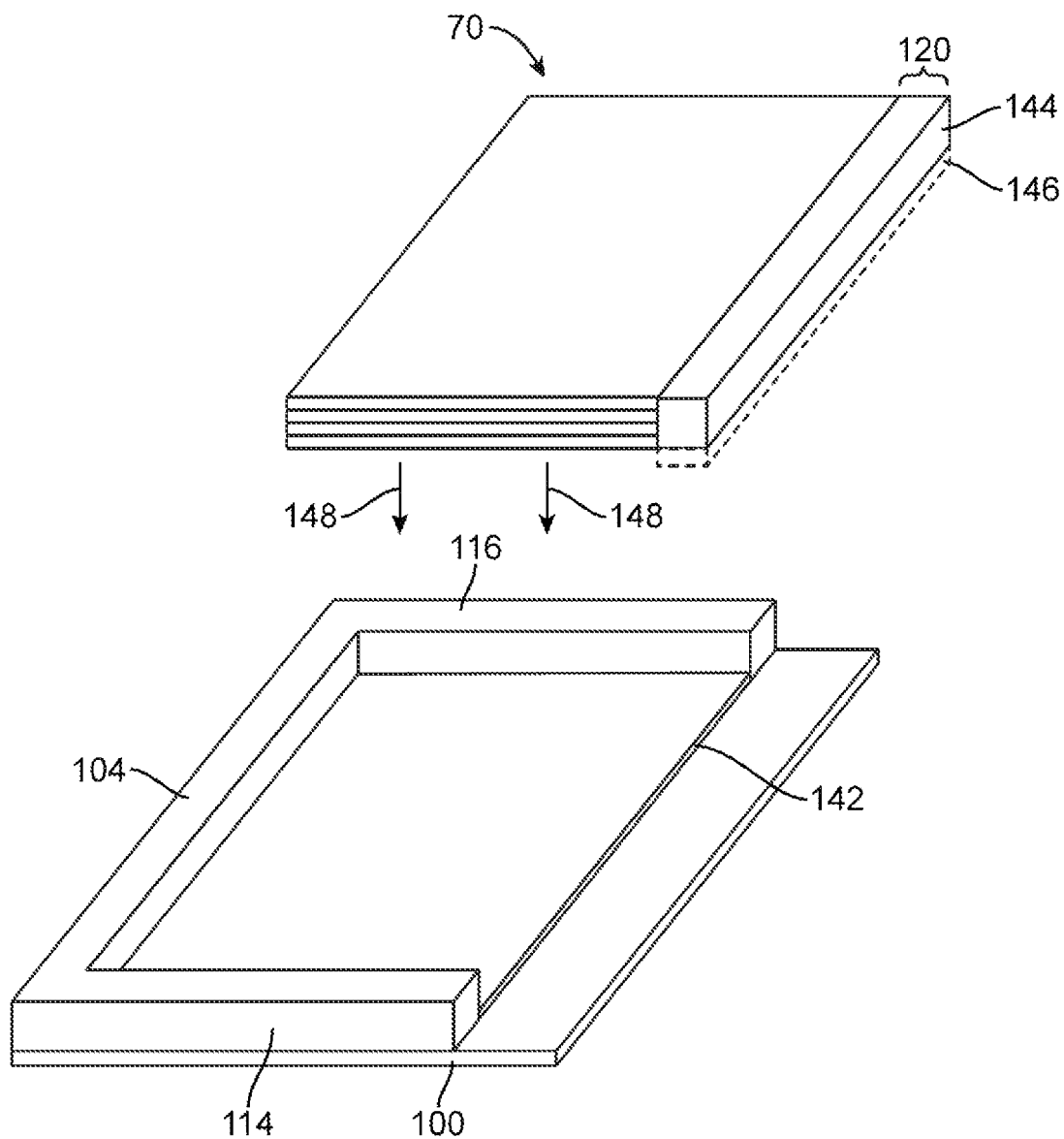
FIG. 20 is a perspective view of illustrative backlight structures showing how optical films that are attached together may be mounted on a metal structural member with insert molded structural members on three sides in accordance with an embodiment of the present invention.

FIG. 20 is a perspective view of a portion of display 14 during assembly operations for display 14 showing how films 70 may be attached (e.g., insert molded or otherwise attached) to a structural member such as support structure 144 prior to being placed over other backlight structures 142 (e.g., light guide 78 and reflector 80).

As shown in FIG. 20, a structural member such as metal support structure 100 may have insert-molded plastic structural members 104, 114 and 116 formed along three edges of member 100. Member 144 may be fourth plastic structural member (e.g., member 144 may be member 102 of FIGS. 7, 8, 9, 19, and/or 20). Member 144 and films 70 may be lowered together in direction 148 onto other backlight structures 142 and metal member 100. If desired, member 144 may include portions such as portion 146 that extend beyond films 70 so that member 144 may be attached to metal member 100 while films 70 rest on structures 142. However, this is merely illustrative. If desired, metal member 100 may have light sources such as LEDs 72 (see FIG. 6) mounted to member 100 adjacent to structures 142 (e.g., in a light bar containing multiple LEDs that extends along the edge of structures 142) that emit light into structures 142. Member 144 may be attached to the light bar or to other portions of member 100 and/or structures 142.

When assembled, structures 144, 104, 114, and 116 may form a structural member such as member 110 of FIG. 9 that has portions formed along each edge of optical films 70.

Figure 21:
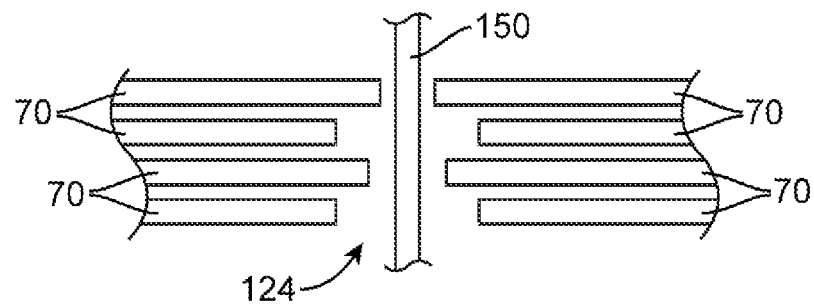
FIG. 21 is a cross-sectional side view of illustrative optical films that are partially constrained by a pin that passes through slots in the films in accordance with an embodiment of the present invention.

FIG. 21 is a cross-sectional side view of a portion of a stack of optical films 70 showing how display 14 may include a pin such as pin 150 that passes through an opening 124 in films 70. As shown in FIG. 20, each optical film 70 may have an opening that, when aligned with corresponding openings in other optical films 70 forms opening 124. Pin

150 may be formed from metal, plastic, glass, ceramics, polymers, combinations of these materials or other suitable materials.

Openings in optical films 70 may be elongated openings such as slots so that, when viewed from a particular direction (e.g., the direction shown in FIG. 21), some openings appear to have a width that is larger than the width of the openings in other films. Films 70 may include openings of various sizes that correspond to the coefficient of thermal expansion (CTE) of that film. For example, a film with a larger CTE may be provided with a larger opening. A film with a smaller CTE may be provided with a smaller opening. However, this is merely illustrative. If desired, films 70 may be provided with openings having a common size with openings in other films. For example, each film 70 may be provided with an elongated opening such as elongated openings 124-1, 124-2, and 124-3 of FIG. 22.

Figure 22:
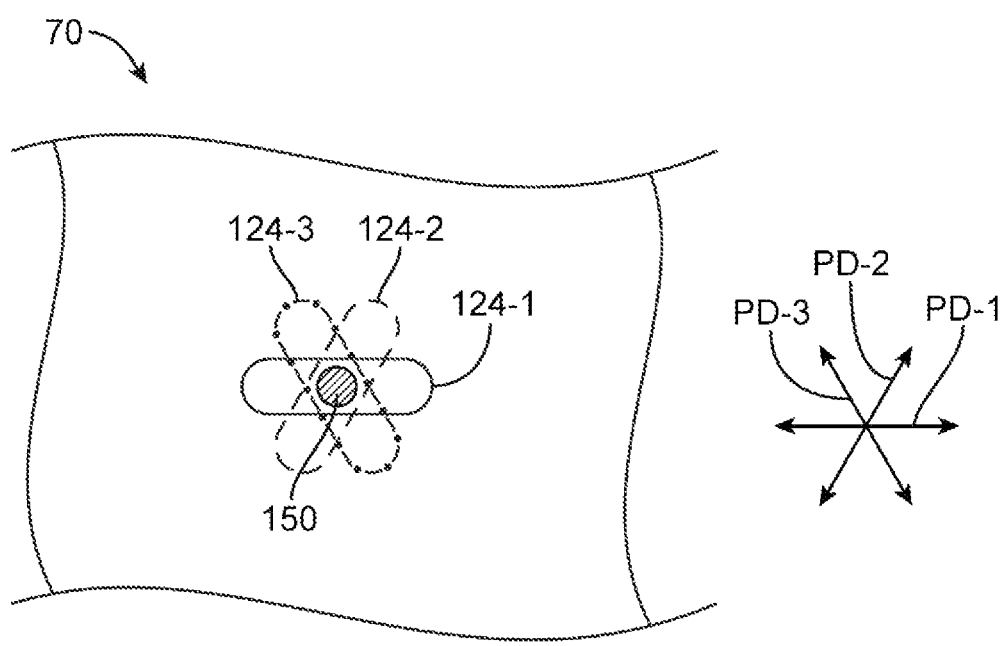
FIG. 22 is a top view of illustrative optical films showing how slots in the films may be oriented in various directions in accordance with an embodiment of the present invention.

As shown in FIG. 22, pin 150 may pass through openings 124-1, 124-2, and 124-3 in three respective films 70. Openings 124-1, 124-2, and 124-3 may have a common overlapping portion and portions that do not overlap due to the orientation of the elongated axis of the openings.

Each optical film 70 may have a preferred direction of thermal expansion (i.e., a direction in which that particular film expands more relative to expansions in other directions when the film is heated). As an example, films 70 of FIG. 22 may include three films having respective preferred directions of thermal expansion PD-1, PD-2, and PD-3. Each film 70 may include an elongated opening that is elongated along the preferred direction of thermal expansion. In the example of FIG. 20, films 70 include a first film having an elongated opening 124-1 that is elongated along preferred direction of thermal expansion PD-1 for that film, a second film having an elongated opening 124-2 that is elongated along preferred direction of thermal expansion PD-2 for that film, and a third film having an elongated opening 124-3 that is elongated along preferred direction of thermal expansion PD-3 for that film.

Providing optical films 70 with elongated openings that are elongated along the preferred direction of thermal expansion for each film and a pin in the elongated openings may help partially constrain the movement of films 70 within display 14 while allowing the films to expand and/or contract when the temperature of the display changes.

The example of FIG. 22 in which films 70 include three optical films having elongated openings is merely illustrative. Films 70 may include more than three optical films having elongated openings, less than three optical films having elongated openings, films with openings having other shapes, and/or optical films without any elongated openings.

The foregoing is merely illustrative of the principles of this invention and various modifications can be made by those skilled in the art without departing from the scope and spirit of the invention.

What is claimed is:

1. A display, comprising:
    backlight structures comprising:
        a light guide plate;
        a plurality of light-emitting diodes that emit light into the light guide plate; and
        first and second optical films on the light guide plate, wherein light that has passed through the light guide plate passes through the first and second optical films during operation of the display, wherein the first optical film has a first coefficient of thermal expansion, wherein the second optical film has a second coefficient of thermal expansion that is different from the first coefficient of thermal expansion, and wherein the first and second optical films are configured to expand to a common lateral size when the display is operating at a display operating temperature; and
    a structural member having an opening, wherein the first and second optical films are mounted within the opening and wherein the structural member holds the first and second optical films together.

2. The display defined in claim 1, the backlight structures further comprising:
    third and fourth optical films on the light guide plate, wherein light that has passed through the light guide plate passes through the first, second, third, and fourth optical films during operation of the display, wherein the third and fourth optical films are mounted within the opening, and wherein the structural member holds the third and fourth optical films together.

3. The display defined in claim 1 wherein the structural member includes portions formed adjacent to each edge of the first and second optical films.

4. The display defined in claim 1, wherein the structural member comprises a plastic structural member.

5. The display defined in claim 4, further comprising a metal support member, wherein the plastic structural member is insert-molded onto the metal support member.

6. The display defined in claim 1 wherein a portion of the first optical film is attached to a corresponding portion of the second optical film.

7. The display defined in claim 2, wherein the third optical film has a third coefficient of thermal expansion, wherein the fourth optical film has a fourth coefficient of thermal expansion, and wherein the third and fourth optical films are configured to expand to the common lateral size when the display is operating at a display operating temperature.

8. A display, comprising:
    a plurality of display layers; and
    a backlight unit that generates light for the display, wherein the plurality of display layers generate images to be displayed to a user using the light, wherein the backlight unit comprises at least one structural member and a plurality of optical films that are interposed between the plurality of display layers and the backlight unit and wherein each of the plurality of optical films has first and second opposing parallel edges, wherein the plurality of optical films are attached together along their respective first edges, and wherein the plurality of optical films are free to move relative to each other along their respective second edges.

9. The display defined in claim 8 wherein the plurality of optical films are attached to the at least one structural member.

10. The display defined in claim 9 wherein the at least one structural member comprises a plastic structural member that is insert molded onto the edge of the optical films.

11. The display defined in claim 8 wherein the at least one structural member comprises a metal structural member.

12. The display defined in claim 11 wherein the backlight unit comprises a reflective layer and a light guide layer that are supported by the metal structural member.

13. The display defined in claim 12 wherein the at least one structural member further comprises an insert molded plastic member on the metal structural member that includes first, second, and third portions that are adjacent to the second respective edges and third and fourth additional respective edges of the plurality of optical films.

14. The display defined in claim 13 wherein the insert molded plastic member includes a ridge and wherein the plurality of display layers are attached to the ridge.

15. The display defined in claim 8 wherein the plurality of display layers comprises a layer of liquid crystal material.

16. A display, comprising:
 a backlight assembly comprising:
  a metal backlight chassis;
  a light guide plate mounted on the metal backlight chassis;
  a plastic backlight chassis attached to the metal backlight chassis that at least partially surrounds the light guide plate;
  a plurality of optical films disposed over the light guide plate, wherein the plurality of optical films forms an optical film stack having first and second opposing surfaces and a peripheral edge formed between the first and second opposing surfaces; and
  a plastic support structure that attaches the plurality of optical films together, wherein the plastic support structure forms at least one edge of the plastic backlight chassis, and wherein the plastic support structure overlaps the first and second opposing surfaces of the optical film stack without overlapping the light guide plate.

17. The display defined in claim 16 wherein the plastic support structure has a recess, and wherein the plurality of optical films are attached together within the recess.

18. The display defined in claim 16 wherein the plastic support structure surrounds at least a portion of the first and second opposing surfaces and the peripheral edge.

19. The display defined in claim 16 wherein the plastic support structure is attached to a portion of the metal backlight chassis that extends laterally beyond a peripheral edge of the light guide plate.

20. The display defined in claim 19 wherein the second opposing surface is interposed between the first opposing surface and the light guide plate, wherein a portion of the plastic support structure extends below the second opposing surface, and wherein the portion of the plastic support structure is attached to the portion of the metal backlight chassis that extends laterally beyond a peripheral edge of the light guide plate.

21. The display defined in claim 16 wherein the plastic support structure is insert-molded onto the plurality of optical films.

22. A display, comprising:
 a plurality of display layers; and
 a backlight unit that generates light for the display, wherein the plurality of display layers generate images to be displayed to a user using the light, wherein the backlight unit comprises at least one structural member and a plurality of optical films that are interposed between the plurality of display layers and the backlight unit and wherein the plurality of optical films are attached together along an a first edge of the plurality of optical films and are free to move relative to each other along a second edge of the plurality of optical films, wherein the at least one structural member comprises a metal structural member, wherein the backlight unit comprises a reflective layer and a light guide layer that are supported by the metal structural member, and wherein the at least one structural member further comprises an insert molded plastic member on the metal structural member that includes first, second, and third portions that are adjacent to respective first, second, and third additional edges of the plurality of optical films.

23. The display defined in claim 22 wherein the insert molded plastic member includes a ridge and wherein the plurality of display layers are attached to the ridge.

24. The display defined in claim 22 wherein the plurality of display layers comprises a layer of liquid crystal material.

\* \* \* \* \*